(12) United States Patent
Dobernig et al.

(10) Patent No.: US 10,150,069 B2
(45) Date of Patent: Dec. 11, 2018

(54) WATER LEVEL SENSOR DEVICE FOR A FUEL FILTER

(71) Applicant: Mahle International GmbH, Stuttgart (DE)

(72) Inventors: Daniel Dobernig, Poggersdorf (AT); Gert Pfeiffer, Klagenfurt (AT); Werner Schadler, Seggauberg (AT); Alfred Weinberger, Gertraud (AT); Peter Zotter, Loedersdorf (AT)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/753,969

(22) PCT Filed: Aug. 9, 2016

(86) PCT No.: PCT/EP2016/068977
§ 371 (c)(1),
(2) Date: Feb. 20, 2018

(87) PCT Pub. No.: WO2017/032591
PCT Pub. Date: Mar. 2, 2017

(65) Prior Publication Data
US 2018/0243671 A1    Aug. 30, 2018

(30) Foreign Application Priority Data

Aug. 21, 2015 (DE) .................. 20 2015 008 998 U
Apr. 7, 2016 (DE) ........................ 10 2016 205 811

(51) Int. Cl.
*G01F 23/24* (2006.01)
*G01F 23/26* (2006.01)
(Continued)

(52) U.S. Cl.
CPC ......... *B01D 36/005* (2013.01); *B01D 29/018* (2013.01); *G01F 23/24* (2013.01);
(Continued)

(58) Field of Classification Search
CPC . G01F 23/242; G01F 23/268; G01N 33/2847; B01D 36/005
See application file for complete search history.

(56) References Cited

U.S. PATENT DOCUMENTS 3,666,903 A    5/1972  Bata et al.
4,511,948 A *  4/1985  Maltby ................. G01F 23/263
                                                    361/280
(Continued)

FOREIGN PATENT DOCUMENTS

DE    3 801 352 A1    7/1989
DE    4 406 200 C1    3/1995
(Continued)

OTHER PUBLICATIONS

English abstract for DE-101 52 257.
(Continued)

*Primary Examiner* — Lisa Caputo
*Assistant Examiner* — Herbert K Roberts
(74) *Attorney, Agent, or Firm* — Fishman Stewart PLLC

(57) ABSTRACT

A water level sensor device of a fuel filter may include a printed circuit board and a water level sensor composed of electrically conductive plastic. The water level sensor may be coupled to the printed circuit board via an electrically conductive metal element. The metal element may be coupled to the water level sensor via a press-fit assembly. The metal element may include a sharp-edged fastening contour configured to tear open the plastic of the water level sensor when the metal element is pressed against the water level sensor.

20 Claims, 1 Drawing Sheet

(51) Int. Cl.
  *B01D 36/00* (2006.01)
  *B01D 29/01* (2006.01)
  *F02M 37/22* (2006.01)

(52) U.S. Cl.
  CPC .......... *G01F 23/242* (2013.01); *G01F 23/268* (2013.01); *F02M 37/22* (2013.01)

(56) References Cited

U.S. PATENT DOCUMENTS

| | | | | |
|---|---|---|---|---|
| 4,638,288 A | * | 1/1987 | Remec | G01F 23/0015 |
| | | | | 340/450 |
| 4,897,244 A | * | 1/1990 | Wallace | G01F 23/263 |
| | | | | 324/663 |
| 5,057,813 A | * | 10/1991 | Sasaki | F01M 11/12 |
| | | | | 340/450.3 |
| 5,057,823 A | * | 10/1991 | Dyer | G01F 23/242 |
| | | | | 324/663 |
| 5,501,102 A | * | 3/1996 | Williamson | G01F 23/24 |
| | | | | 73/304 R |
| 5,626,053 A | | 5/1997 | Williamson | |
| 5,915,999 A | * | 6/1999 | Takenaka | H01R 12/585 |
| | | | | 439/751 |
| 7,571,646 B1 | * | 8/2009 | Houghton | G01F 23/24 |
| | | | | 73/304 C |
| 2002/0172789 A1 | * | 11/2002 | Watson | B82Y 10/00 |
| | | | | 428/36.91 |
| 2004/0231976 A1 | * | 11/2004 | Gadini | A47L 15/4229 |
| | | | | 204/240 |
| 2006/0070956 A1 | * | 4/2006 | Herrmann | B01D 35/26 |
| | | | | 210/744 |
| 2006/0103393 A1 | * | 5/2006 | Stahlmann | G01F 23/24 |
| | | | | 324/658 |
| 2006/0196264 A1 | * | 9/2006 | Stahlmann | G01F 23/24 |
| | | | | 73/304 R |
| 2009/0146670 A1 | * | 6/2009 | Thobe | G01F 13/00 |
| | | | | 324/691 |
| 2009/0301190 A1 | * | 12/2009 | Ross, Jr. | G01F 23/265 |
| | | | | 73/304 C |
| 2011/0259802 A1 | * | 10/2011 | Wieczorek | B01D 36/005 |
| | | | | 210/96.1 |
| 2013/0152676 A1 | * | 6/2013 | Yamaguchi | G01F 23/268 |
| | | | | 73/304 C |
| 2015/0021246 A1 | * | 1/2015 | Sturgess | B01D 35/18 |
| | | | | 210/104 |
| 2016/0008749 A1 | * | 1/2016 | Morris | B01D 35/005 |
| | | | | 210/86 |
| 2016/0236123 A1 | * | 8/2016 | Girondi | B01D 36/005 |

FOREIGN PATENT DOCUMENTS

| | | | | |
|---|---|---|---|---|
| DE | 101 52 257 A1 | 11/2002 | | |
| DE | 20 2007 018 665 U1 | 1/2009 | | |
| DE | 10 2009 032 036 A1 | 5/2010 | | |
| EP | 0584557 A1 | * | 3/1994 | .......... G01N 27/121 |

OTHER PUBLICATIONS

English abstract for DE-4 406 200.
English abstract for DE-3 801 352.
English abstract for DE-10 2009 032 036.

* cited by examiner

WATER LEVEL SENSOR DEVICE FOR A FUEL FILTER

CROSS-REFERENCE TO RELATED APPLICATIONS

This application claims priority to International Patent Application No. PCT/EP2016/068977, filed on Aug. 9, 2016, German Patent Application No. DE 10 2016 205 811.8, filed on Apr. 7, 2016, and German Patent Application No. DE 20 2015 008 998.4, filed on Aug. 21, 2015, the contents of each of which are hereby incorporated by reference in their entirety.

TECHNICAL FIELD

The present invention relates to a water level sensor device of a fuel filter. The invention relates in addition to a fuel filter equipped with such a water level sensor device.

BACKGROUND

Water level sensors are used in fuel filters in order to detect, with regard to its quantity, and to temporarily discharge the water which is continuously separated from the fuel. Such water level sensors are usually arranged here in water accumulators and report a water level, which is present there, continuously or cyclically to a control device, which on reaching of a predefined level generates a signal and, for example, discharges the water which has collected in the water accumulator.

Usually, the water level sensors which are used for this are configured as plastic injection moulded parts with electrically conducting poles, wherein via the electrically conducting poles and the water, an electrically conducting connection can be created, which informs via the water level present respectively in the water accumulator. The electrically conducting poles can be configured here for example in the manner of lines, wherein increasingly also electrically conducting plastics are being used, which have, for example, electrically conducting fibres, such as in particular carbon fibres.

When water level sensors are produced here by a conventional plastic injection moulding process, then a smooth surface in the plastic injection mould or respectively in the injection moulding tool produces a so-called injection skin, because the fibres arranged in the injected plastic are aligned substantially parallel to the wall surface of the plastic injection mould. The produced injection skin has, however, an insulating effect with respect to the remaining plastic material with the corresponding fibre content, because during the injection moulding process no more fibres are present on the surface, or only a reduced fibre content. Hereby, the electrical conductivity on the surface of the water level sensor is negatively impaired, which can lead to difficulties in particular with an electrical connecting to another component.

SUMMARY

The present invention is concerned with the problem of indicating a water level sensor device which overcomes the known disadvantages from the prior art.

This problem is solved according to the invention by the subject of the independent claim(s). Advantageous embodiments are the subject of the dependent claims.

The present invention is based on the general idea of connecting a water level sensor, made of an electrically conductive plastic, electrically and mechanically to a printed circuit board by means of a sharp-edged metal pin pressed therein, in particular a brass pin, wherein the sharp-edged embodiment of the metal element in its region penetrating into the electrically conductive plastic of the water level sensor, together with the pressing in of the metal element into the water level sensor brings about a tearing open of a surface of the electrically conductive plastic of the water level sensor and thereby produces an electrically conducting contact between the electrically conducting fibres of the water level sensor on the one hand, and the metal element on the other hand. The water level sensor device of a fuel filter according to the invention has here the previously mentioned water level sensor made from electrically conductive plastic, and a printed circuit board. Such a printed circuit board can also contain, for example, control electronics, which actuate for example a water outlet as a function of the water level determined by the water level sensor. The water level sensor is connected here to the printed circuit board via the previously described metal element, wherein the metal element is connected to the water level sensor via a press-fit assembly. The brass element has here the previously described sharp-edged fastening contour, in particular configured in a firtree shape or in a sawtooth-like manner, by means of which it is pressed into the electrically conductive plastic of the water level sensor and in so doing tears open the latter and thereby in particular cuts up an injection skin and produces an electrically conductive contact to the electrically conductive fibres of the electrically conductive plastic. Compared to a screwed connection, the pressing in, in accordance with the invention, of the metal element into the water level sensor offers not only a saving of time in manufacture, but furthermore also necessitates a distinctly reduced space requirement, which in the case of a pressing-in connection for example only has a diameter of 2-3 mm, but in the case of a screwed connection already has a diameter of approximately 8 mm. The essential advantage, however, is the tearing open of the injection skin on the pressing in of the metal element into the plastic of the water level sensor, whereby a reliable electrical connection between the metal element and the water level sensor can be created in a comparatively simple manner, without a major technical effort being necessary for this.

In an advantageous further development of the solution according to the invention, the water level sensor has an opening, into which the metal element is pressed in. The fastening contour of the metal element can pressed in here, without pre-boring or respectively without opening, directly into the electrically conductive plastic of the water level sensor, wherein alternatively also the provision of an opening in the water level sensor is conceivable, which enables a guided pressing-in of the fastening contour into the water level sensor. An internal diameter of the opening, regardless of whether injected or bored, is slightly smaller here than an external diameter of the fastening contour, so that on a pressing in of the fastening contour of the metal element into the plastic of the water level sensor, in any case a tearing open of the electrically conductive plastic takes place.

In a further advantageous embodiment of the solution according to the invention, the printed circuit board has an opening in which the metal element is pressed, braced, locked or riveted. This non-exclusive list already suggests what diverse possibilities exist for fastening the metal element, in particular the brass element, on the printed circuit board, wherein in particular a pressing in or respectively a locking of the metal element in/to the printed circuit board enables a connecting technique which is able to be produced in a technically simple manner on the one hand, and quickly on the other hand.

In a further advantageous embodiment of the solution according to the invention, the metal element has a collar, via which, in the assembled state, it lies against the water level sensor and/or against the printed circuit board. Via such a collar, a haptic stop contour can be created, which reliably indicates that an assembly end position has been reached. Hereby, in particular an assembly aid can be created.

Expediently, the electrically conductive plastic is a fibre-reinforced thermoplast with at least 8% by weight, preferably 40% by weight carbon fibres. Through the provision of carbon fibres, the electrical conductivity can be improved. Alternatively, the addition of soot is also possible. The carbon fibres and/or the soot provided in the electrically conductive plastic undertake here not only the function of the electrical conductivity, but in addition reinforce the water level sensor. Alternatively of course further components/additions can also bring about the electrical conductivity of the plastic, such as e.g. metal fibres, aluminium flakes, etc. It is also conceivable that the plastic itself is electrically conductive without further addition, such as e.g. poly-3,4-ethylenedioxythiophene, polystyrene sulfonate, etc. Of course, other fibres, in particular glass fibres, can also be additionally provided as reinforcement elements, by which the water level sensor can be further reinforced.

In a further advantageous embodiment of the solution according to the invention, the electrically conductive plastic has a PA66 GF22 CF8 and is thereby formed from polyamide 66 and 22% by weight glass fibres and 8% by weight carbon fibres. An alternative embodiment is formed by an electrically conductive plastic of PA66 CF40 and therefore consists of polyamide 66 and 40% by weight carbon fibres or is formed by an electrically conductive plastic of PA6 CF 40 and therefore consists of polyamide 6 and 40% by weight carbon fibres.

The present invention is further based on the general idea of using a previously described water level sensor device in a fuel filter. Hereby, it is possible to enable a particularly exact detecting of a water level, in particular in a water accumulator of the fuel filter, in a comparatively simple and favourably-priced manner.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
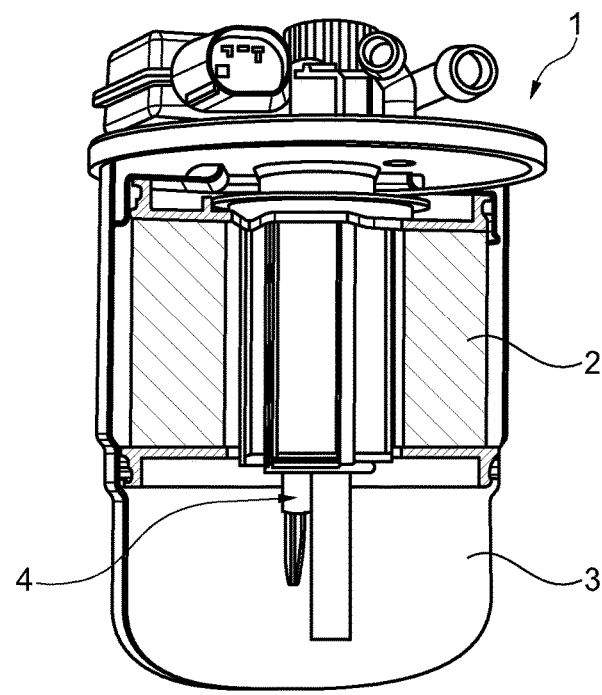
FIG. 1 a sectional illustration through a fuel filter according to the invention, with a water level sensor device according to the invention, FIG. 2 a sectional illustration through a water level sensor device according to the invention, FIG. 3 a sectional illustration as in FIG. 2, but with a different embodiment of the metal element.

According to FIG. 1, a fuel filter 1 according to the invention has a ring filter element 2 arranged therein and a water accumulator 3 arranged beneath the ring filter element 2. The water accumulator 3 serves here in a known manner for collecting the water which is separated from the filtered fuel, in order in particular to be able to reduce a risk of corrosion in a subsequently arranged internal combustion engine. In order to be able to estimate here when the water accumulator 3 has to be emptied, a water level must be detected in the latter, for which a water level sensor 4 (cf. also FIG. 2) is provided. The water level sensor 4 is produced here by the generally known plastic injection moulding process, wherein the plastic 7 which is used for this is fibre-reinforced and has electrically conducting fibres 11, such as carbon fibres/graphite fibres, for example. In water level sensors produced in such a manner hitherto, however, the problem often existed that owing to a smooth internal contour of a plastic injection mould, an injection skin formed, in which only a reduced content of fibres 11 was present, under which the electrical conductivity suffered.

The described water level sensor 4 is a component part here of a water level sensor device 5 (cf. in particular also FIGS. 2 and 3), which as well as the water level sensor 4 made from conductive plastic 7, additionally comprises a printed circuit board 6. The water level sensor 4 is connected here to the printed circuit board 6 via a metal element 8, whilst the metal element 8 is connected via a press-fit assembly 9 to the water level sensor 4, in particular is pressed into the latter. Said metal element 8 can be configured for example as a brass element 8'. For this, the metal element 8 has a sharp-edged, in particular firtree-shaped or sawtooth-like fastening contour 10, tearing open the electrically conductive plastic 7 on pressing in of the metal element 8. The fastening contour 10 has here primarily the task of tearing open an injection skin which is possibly present, where only a reduced content of fibres 11 was present, and thereby of producing an electrical contacting between the metal element 8 on the one hand and the electrically conductive plastic 7 on the other hand.

The metal element 8 can be pressed in here directly into the water level sensor 4, wherein alternatively it is also conceivable that firstly an opening or respectively a bore is produced in the water level sensor, into which subsequently the fastening contour 10 of the metal element 8 is pressed in. If the opening is bored, a tearing open of the electrically poorer conducting injection skin already takes place hereby. If, however, the opening is also injected, then a tearing open of the injection skin takes place only on the pressing in of the metal element 8 with its fastening contour 10 into this opening.

Figure 2:
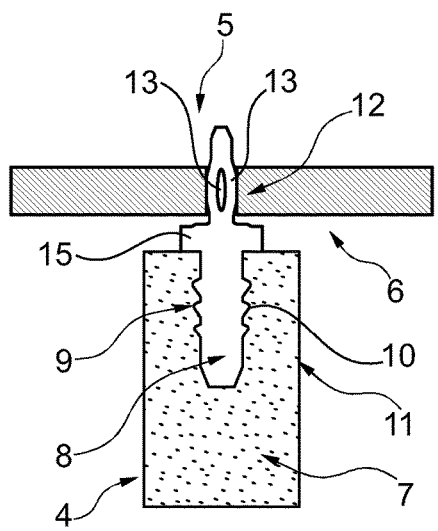
Figure 3:
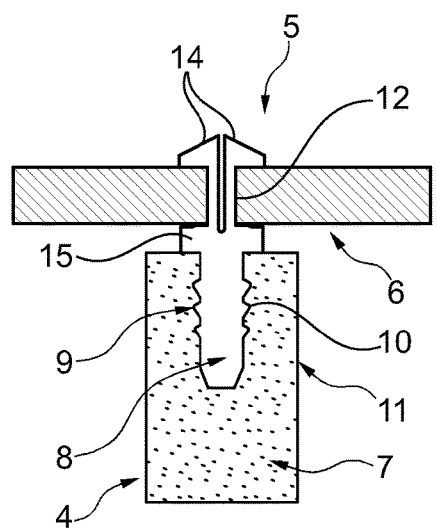

Observing further FIGS. 2 and 3, it can be seen that the printed circuit board 6 has an opening 12, in which the metal element 8 is pressed, braced (cf. FIG. 2), riveted or locked (cf. FIG. 3). With a bracing of the metal element 8 in the opening 12 of the printed circuit board 6, as is shown according to FIG. 2, the metal element 8 can have tensioning arms 13 applying a radial force in its region which is pressed into the opening 12, via which tensioning arms it braces and fixes itself in the opening 12. When the metal element 8 and thereby also the water level sensor 4 is connected to the printed circuit board 6 via a snap connection, as is illustrated for example according to FIG. 3, then the metal element 8 has detent arms 14, via which it is locked in the opening 12 or respectively engages behind the latter.

Observing FIGS. 2 and 3 further, it can be seen that the metal element 8 has a collar 15, via which, in assembled state, it lies against the water level sensor 4 and/or against the printed circuit board 6.

For example, a fibre-reinforced thermoplast with at least 8% by weight carbon fibres 11 can be used as electrically conductive plastic 7. The carbon fibres bring about here not only the electrical conductivity, but additionally reinforce the water level sensor 4. Of course, further reinforcing fibres 11, such as for example glass fibres, can also be embedded as reinforcement element in the electrically conductive plastic. A particularly preferred electrically conductive plastic 7 for use in the water level sensor 4 according to the invention is, for example, a PA6 CF40 with polyamide 6, 40% by weight carbon fibres. Through a higher carbon fibre content and/or soot content, an improved surface conductivity can be produced. The increase of the carbon fibre content up to 40% by weight distinctly increases the probability of uninterrupted conducting paths through the plastic 7. This means that the conductivity increases (resistance decreases). The high content of fibres 11 of the plastic 7 guarantees furthermore excellent strength properties. Therefore, the material is suitable for plastic housings. At the same time, this plastic 7 can dissipate ESD voltages in an excellent manner when it is used as a housing material. In contact with fuels and water in connection with direct current from the measurement electronics, the material behaves in an inert manner, in contrast to metals, which likewise represents a considerable advantage.

Of course, the water level sensor 4 according to the invention can also be offered separately from the fuel filter 1, for example as a replacement and/or retrofit part.

With the water level sensor device 5 according to the invention it is possible for the first time to reliably contact the electrically conductive and injected plastic 7 electrically to a printed circuit board 6, namely via said metal element 8, in particular the brass element 8', which generally purely theoretically can also be made from copper or from another metallic material having good electrically conducting properties, because with a pressing in of the sharp-edged fastening contour 10 of the metal element 8 in any case a tearing open of the injection skin, which reduces the electrical conductivity, occurs, and thereby an improved electrical connection can be produced.

The invention claimed is:

1. A water level sensor device of a fuel filter, comprising:
a printed circuit board;
a water level sensor composed of electrically conductive plastic coupled to the printed circuit board via an electrically conductive metal element;
wherein the metal element is coupled to the water level sensor via a press-fit assembly; and
wherein the metal element includes a sharp-edged fastening contour configured to tear open the plastic of the water level sensor when the metal element is pressed against the water level sensor.

2. The water level sensor device according to claim 1, wherein the water level sensor includes an opening and the metal element is pressed into the opening.

3. The water level sensor device according to claim 1, wherein the printed circuit board includes an opening and the metal element is one of pressed, braced, and riveted in the opening.

4. The water level sensor device according to claim 3, wherein one of:
the metal element includes at least two tensioning arms applying a radial force in a region of the metal element which is pressed into the opening, the at least two tensioning arms bracing the metal element within the opening; and
the metal element includes at least two detent arms fixing the metal element within the opening.

5. The water level sensor device according to claim 1, wherein the metal element includes a collar that contacts at least one of the water level sensor and the printed circuit board when in an assembled state.

6. The water level sensor device according to claim 1, wherein the electrically conductive plastic is a fibre-reinforced thermoplastic with carbon fibres.

7. The water level sensor device according to claim 1, wherein the electrically conductive plastic includes glass fibres.

8. The water level sensor device according to claim 1, wherein one of:
the electrically conductive plastic has a composition including polyamide 66, approximatley 22% by weight glass fibres, and approximately 8% by weight carbon fibres; and
the electrically conductive plastic has a composition including polyamide 66 and approximately 40% by weight carbon fibres.

9. The water level sensor device according to claim 1, wherein the sharp-edged fastening contour is at least one of pinetree shaped and sawtooth like.

10. The water level sensor device according to claim 6, wherein the electrically conductive plastic is at least 8% by weight carbon fibres.

11. The water level sensor device according to claim 10, wherein the electrically conductive plastic is approximately 40% by weight carbon fibres.

12. A fuel filter comprising:
a water level sensor device including:
a printed circuit board; and
a water level sensor composed of electrically conductive plastic coupled to the printed circuit board via an electrically conductive metal element, the metal element coupled to the water level sensor via a press-fit assembly;
wherein the metal element includes a sharp-edged fastening contour configured to tear open the plastic of the water level sensor when the metal element is pressed against the water level sensor.

13. The fuel filter according to claim 12, wherein the water level sensor includes an opening which the metal element is pressed in.

14. The fuel filter according to claim 12, wherein the printed circuit board includes an opening in which the metal element is one of pressed, braced, and riveted.

15. The fuel filter according to claim 14, wherein one of:
the metal element includes at least two tensioning arms applying a radial force in a region of the opening, the at least two tensioning arms bracing the metal element within the opening; and
the metal element includes at least two detent arms fixing the metal element within the opening.

16. The fuel filter according to claim 12, wherein the metal element includes a collar that contacts at least one of the water level sensor and the printed circuit board when in an assembled state.

17. The fuel filter according to claim 12, wherein the electrically conductive plastic is a fibre-reinforced thermoplastic with carbon fibres.

18. The fuel filter according to claim 12, wherein one of:
the electrically conductive plastic has a composition including plyamide 66, approximately 22% by weight glass fibres, and approximately 8% by weight carbon fibres; and
the electrically conductive plastic has a composition including plyamide 66 and approximately 40% by weight carbon fibres.

19. The fuel filter according to claim 12, wherein the sharp-edged fastening countour is configured at least one of pinetree shaped and sawtooth like.

20. The fuel filter according to claim 17, wherein the electrically conductive plastic as at least 8% by weight carbon fibres.

* * * * *